United States Patent
Mittal et al.

(10) Patent No.: US 10,169,336 B2
(45) Date of Patent: Jan. 1, 2019

(54) TRANSLATING STRUCTURED LANGUAGES TO NATURAL LANGUAGE USING DOMAIN-SPECIFIC ONTOLOGY

(71) Applicant: International Business Machines Corporation, Armonk, NY (US)

(72) Inventors: Ashish R. Mittal, Bangalore (IN); Diptikalyan Saha, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/412,317

(22) Filed: Jan. 23, 2017

(65) Prior Publication Data

US 2018/0210879 A1    Jul. 26, 2018

(51) Int. Cl.
*G06F 17/27* (2006.01)
*G06F 17/28* (2006.01)
*G06F 17/30* (2006.01)

(52) U.S. Cl.
CPC ...... *G06F 17/2854* (2013.01); *G06F 17/2785* (2013.01); *G06F 17/289* (2013.01); *G06F 17/30401* (2013.01); *G06F 17/30985* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

| 5,924,089 A | 7/1999 | Mocek et al. |
| 7,548,933 B2 | 6/2009 | Krishnamurthy et al. |

(Continued)

FOREIGN PATENT DOCUMENTS

EP    0387226 A1    9/1990

OTHER PUBLICATIONS

Shah et al., Athena: An Ontology-Driven System for Natural Language Querying over Relational Data Stores, 2016, VLDB, pp. 1209-1220.*

(Continued)

*Primary Examiner* — Lamont M Spooner
(74) *Attorney, Agent, or Firm* — Ryan, Mason & Lewis, LLP (57) ABSTRACT

Methods, systems, and computer program products for translating structured languages to natural language using domain-specific ontology are provided herein. A computer-implemented method includes determining similarities among multiple natural language query interpretations derived from an input query, determining differences among the multiple natural language query interpretations, and generating natural language descriptions of each of the multiple natural language query interpretations based on analysis of the determined similarities, the determined differences, and the input query. The method also includes producing, for each of the natural language query interpretations, a natural language string that represents one or more unambiguous interpretations of the input query, wherein the producing comprises consolidating the generated natural language descriptions. Further, the method includes outputting each of the produced natural language strings to a user.

20 Claims, 7 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | |
|---|---|---|---|
| 7,685,116 | B2 | 3/2010 | Pell et al. |
| 8,000,957 | B2 | 8/2011 | Deshpande et al. |
| 2007/0136251 | A1 | 6/2007 | Colledge et al. |
| 2008/0154853 | A1* | 6/2008 | Deshpande ....... G06F 17/30967 |
| 2008/0195601 | A1* | 8/2008 | Ntoulas ............. G06F 17/30616 |
| 2011/0161311 | A1* | 6/2011 | Mishne ............... G06F 17/3064 |
| | | | 707/719 |
| 2014/0136183 | A1* | 5/2014 | Hebert .............. G06F 17/30654 |
| | | | 704/9 |
| 2014/0163959 | A1* | 6/2014 | Hebert ................ G06F 17/2785 |
| | | | 704/9 |
| 2014/0172900 | A1* | 6/2014 | De Barros .......... G06F 17/3064 |
| | | | 707/765 |
| 2014/0254934 | A1* | 9/2014 | Laxminarayana Bhat .................. G06F 17/30265 |
| | | | 382/173 |
| 2017/0193020 | A1* | 7/2017 | Yi ...................... G06F 17/30321 |
| 2017/0193551 | A1* | 7/2017 | Santi .................. G06Q 30/0256 |

OTHER PUBLICATIONS

Luk et al. ELFS: English Language from SQL, ACM Transactions on Database Systems (TODS) 11.4 (1986):447-472.

Nomo et al. Sorry, I don't Speak SPARQL: Translating SPARQL Queries into Natural Language, Proceedings of the 22nd International Conference on World Wide Web. International World Wide Web Conferences Steering Committee, 2013.

Li et al. Nalir: An Interactive Natural Language Interface for Querying Relational Databases, Proceedings of the 2014 ACM SIGMOD International Conference on Management of Data. ACM, 2014.

Mellish et al. The Semantic Web as a Linguistic Resource: Opportunities for Natural Language Generation, Knowledge-Based Systems 19.5 (2006): 298-303.

Androutsopoulos et al. Generating Natural Language Descriptions from OWL Ontologies: A Detailed Presentation of the NaturalOWL System, Tech. Rep., NLP Group, Department of Informatics, Athens University of Economics and Business, Greece, 2012.

* cited by examiner

```
NLG( List<KGQL>, String originalQuestion){
    if (more than one KGQL){
                    for each pair<KGQL1, KGQL2>{
                                    for each clause of KGQL1, KGQL2{
                                                    key_difference += diff (KGQL1, clause, KGQL2)
                                    }
                    }
                    for each clause of first KGQL{
                                    common = diff(KGQL, key_difference_clause)
                    }
        }
        for all differences{
        if difference is for name {   //(e.g.company name, city name, etc)
                        use description from the KGQL
        }else{                                                                  //(e.g. time info (since 2015))
                        use description from the original question
        }
        }
    For each clause in common{
                    common NL string += clause
    }
    For each KGQL{
                    for each clause of KGQL{         //select, from etc..
                                    if clause is a key difference
                                                    difference NL string += clause;
                                    }
                    }
                    NL String = common NL String + difference NL String
    }
    output List<NL String>
    for each pair<KGQL1, KGQL2>{
                    for each clause of KGQL1, KGQL2{
                                    difference += diff (KGQL1, clause, KGQL2)
                    }
                    if(difference is only in name){
                                    P1 = create same presentation for KGQL1 and KGQL2
                                    List<Presentation>.add(P1)
                    }
        }
        for each KGQL{
        if(KGQL not in List<Presentation>){
                        P2 = create new Presentation for KGQL and add to list
        }
    }
    Output List<Presentation>

TRANSLATING STRUCTURED LANGUAGES TO NATURAL LANGUAGE USING DOMAIN-SPECIFIC ONTOLOGY

FIELD

The present application generally relates to information technology, and, more particularly, to language translation techniques.

BACKGROUND

Given existing translation processes, a user asks a natural language (NL) query, and the NL query is interpreted using domain ontology to generate one or more interpretations, which represent the semantics of the NL query. The interpretations can be translated to a given language and executed against a data store to produce an output. However, with such approaches, it can be difficult to determine if a given interpretation is correct. Further, such approaches include an inability to express the semantics of complex interpretation(s) to the user in a readable fashion.

SUMMARY

In one embodiment of the present invention, techniques for translating structured languages to natural language using domain-specific ontology are provided. An exemplary computer-implemented method can include steps of determining one or more similarities among multiple natural language query interpretations derived from an input query, determining one or more differences among the multiple natural language query interpretations derived from the input query, and generating one or more natural language descriptions of each of the multiple natural language query interpretations based on analysis of (i) the one or more determined similarities, (ii) the one or more determined differences, and (iii) the input query. The method also includes producing, for each of the multiple natural language query interpretations, a natural language string that represents one or more unambiguous interpretations of the input query, wherein the producing comprises consolidating the generated natural language descriptions. Further, the method includes outputting each of the produced natural language strings to a user.

In another embodiment of the invention, an exemplary computer-implemented method can include steps of generating one or more structured language query interpretations of a query inputted by a user, translating the one or more structured language query interpretations to natural language using one or more domain-specific ontologies, and determining (i) one or more similarities among the natural language query interpretations and (ii) one or more differences among the natural language query interpretations. The method also includes generating one or more natural language descriptions of each of the multiple natural language query interpretations based on analysis of (i) the one or more determined similarities, (ii) the one or more determined differences, and (iii) the query, and producing, for each of the multiple natural language query interpretations, a natural language string that represents one or more unambiguous interpretations of the query, wherein the producing comprises consolidating the generated natural language descriptions. Further, the method includes outputting each of the produced natural language strings to a user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes translating structured languages to natural language using domain-specific ontology and/or one or more graph-based semantic representations. At least one embodiment of the invention includes utilizing different interpretations of an inputted natural language query to provide results to a user. Such an embodiment can include utilizing the different interpretations and the original (input) question/query to create natural language descriptions of the interpretations, as well as to create a presentation of one or more responses, considering the similarity and differences between the interpretations.

As used herein, an ontology refers to a descriptive model that includes a set of types, properties, and relationship types. As also used herein, a knowledge graph refers to a semantic network containing facts about relationships between different objects. Further, as used herein, instances refer to physical realizations of a knowledge graph, a schema describes the structure in a formal language, an entity refers to a real world object, and an entity type refers to the semantics of an entity.

As detailed herein, a compact natural language description generated via implementation of one or more embodiments of the invention can be based on the observation that it is not always relevant to present all details of all interpretations. Accordingly, in such embodiments, utilizing just the differences among interpretations can enable the user to understand the noted differences while keeping the description unambiguous.

By way of illustration, consider the example query seeking "loans by Company X," and with such an example query, there can be different possible cases: (1) Company X as a lender or a borrower, and (2) Company X as Company X-India or Company X-US. Such an example scenario can create four interpretations: (i) Company X-US loans wherein Company X is a lender; (ii) Company X-India loans wherein Company X is a borrower; (iii) Company X-India loans wherein Company X is a lender; and (iv) Company X-US wherein Company X is a borrower.

Further, consider a situation wherein Company X is only a lender. As such, in one or more embodiments of the invention, the above-noted interpretations would be limited to those with Company X as a lender. Additionally, at least one embodiment of the invention can include omitting the detail that Company X is a lender in the natural language description to make the description more compact. Accordingly, via such an embodiment, the output to the user can include: (1) Show Company X-US loans, and (2) Show Company X-India loans.

As also detailed herein, one or more embodiments of the invention can be implemented independent of query language, because a user query can be answered using different data stores (text, graphs, databases, etc.). As noted above, interpretations can expose the understanding of a system for a given query, but such interpretations can also potentially be too complex for a user to comprehend. Consequently, at least one embodiment of the invention includes converting interpretations to natural language. Accordingly, based on an input of an interpretation, at least one embodiment of the invention can include implementing an NL translator to generate an output that includes an NL string that explains the interpretation. In one or more embodiments of the invention, if this NL string is used as a query, then a user will see only one interpretation. Such a translated output can assist in user readability and comprehension of complex interpretations. Also, the NL output can assist a user in forming unambiguous queries, because each NL answer corresponds to exactly one interpretation. Further, such an NL output can help in abstracting the complexity of the domain while allowing the user to verify whether the system understood what the user intended.

Figure 1:
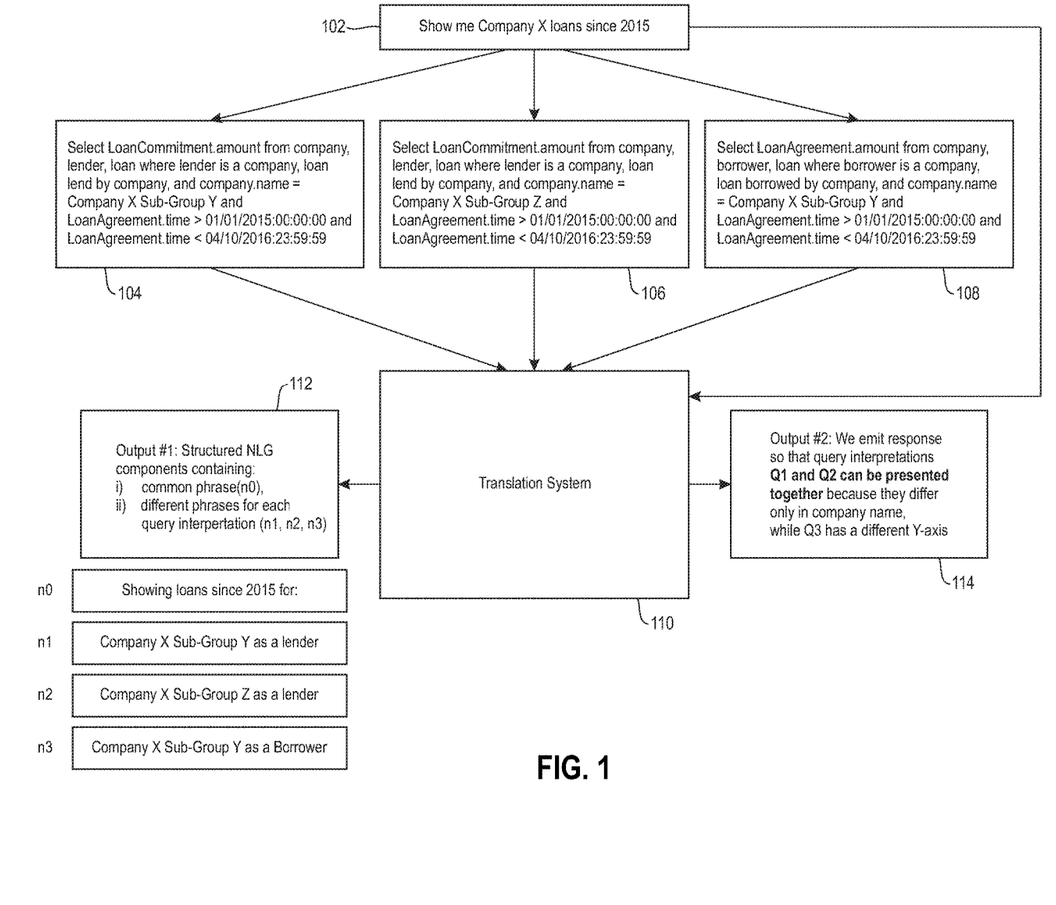
FIG. 1 is a diagram illustrating an exemplary embodiment of the invention.

FIG. 1 is a diagram illustrating an example embodiment of the invention. By way of illustration, FIG. 1 depicts an example query 102, which asks "Show me Company X loans since 2015." FIG. 1 also depicts structured query interpretations 104, 106 and 108. Interpretation 104 states "Select LoanCommitment.amount from company, lender, loan where lender is a company, loan lend by company, and company.name=Company X Sub-Group Y and LoanAgreement.time>01/01/2015:00:00:00 and LoanAgreement.time<04/10/2016:23:59:59." Interpretation 106 states "Select LoanCommitment.amount from company, lender, loan where lender is a company, loan lend by company, and company.name=Company X Sub-Group Z and LoanAgreement.time>01/01/2015:00:00:00 and LoanAgreement.time<04/10/2016:23:59:59." Further, interpretation 108 states "Select LoanAgreement.amount from company, borrower, loan where borrower is a company, loan borrowed by company, and company.name=Company X Sub-Group Y and LoanAgreement.time>01/01/2015:00:00:00 and LoanAgreement.time<04/10/2016:23:59:59."

Additionally, FIG. 1 also depicts a translation system 110, which takes as input interpretations 104, 106 and 108, as well as the original query 102, to create natural language descriptions of the interpretations. Such an output is depicted in FIG. 1 as output 112. As illustrated in the FIG. 1 example, output 112 can include structured natural language generation (NLG) components containing (i) a common phrase (n0), and (ii) different phrases for each query interpretation (n1, n2, and n3). In the example embodiment illustrated in FIG. 1, n0 represents "showing loans since 2015 for," while n1 represents "Company X Sub-Group Y as a lender," n2 represents "Company X Sub-Group Z as a lender," and n3 represents "Company X Sub-Group Y as a borrower." Accordingly, at least one embodiment of the invention can include producing, for each interpretation, a unique string that can generate one or more unambiguous interpretations. For example, "Showing loans since 2015 for Company X Sub-Group Y as a lender" will produce a single interpretation. This can assist a user in understanding ambiguous parts of a query, which can enable the user to ask the intended precise query in the future.

Also, translation system 110 can additionally use the input of interpretations 104, 106 and 108, and the original query 102, to create a compact presentation of a response. Such an output is depicted in FIG. 1 as output 114. As illustrated in the FIG. 1 example, output 114 can include a response such that query interpretations 104 and 106 can be presented together because they differ only in company name, while query interpretation 108 has a different Y-axis (from interpretations 104 and 106). Such response can include, for example, a graph input or a table input which is rendered in a user interface. For instance, if it is determined that for two interpretations, the Y-axis is the same, then instead of showing two tables [X1, Y] and [X2, Y], at least one embodiment of the invention can show the interpretations as [X1, X2, Y].

Figure 2:
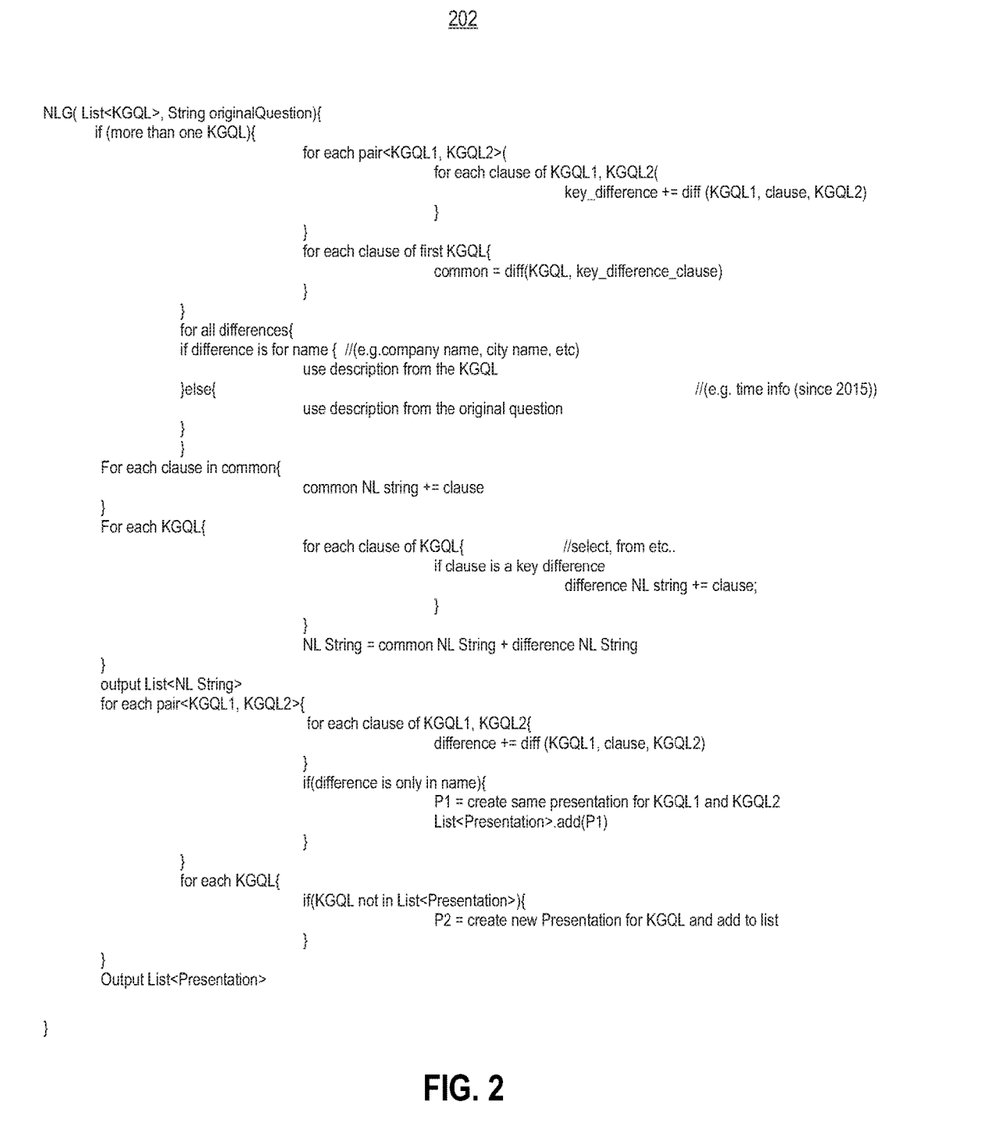
FIG. 2 is a diagram illustrating a natural language generation algorithm, according to an exemplary embodiment of the invention.

FIG. 2 is a diagram illustrating a natural language generation algorithm 202, according to an exemplary embodiment of the invention. Algorithm 202 takes, as input, multiple interpretations for which the natural language description is to be generated and presented compactly. For each pair of such interpretations, common elements and difference elements between the pair are identified. Data structures are maintained to store all such common and key-difference elements. Subsequently, key differences are identified and used to generate a natural language description. For time phrases, descriptions from input sentences can be used, while for named entities, descriptions from an interpretation and/or an actual value in the data store can be used. Additionally, common natural language string generation can be carried out using the common elements identified above. Subsequently, the difference elements are analyzed and appended to common elements to create a compact natural language description. The list of such strings are outputted against each interpretation.

For the compact presentation aspect, at least one embodiment of the invention determines the differences in each pair of interpretations. If, between any two interpretations, the differences exist only in name value, such an embodiment includes combining the interpretations to create a compact presentation (such as [X1, X2, Y]) in lieu of a traditional presentation (such as [X1, Y] [X2, Y]). This information is given as output to a presentation module to generate data structures necessary to render them accordingly in a user interface.

Figure 3:
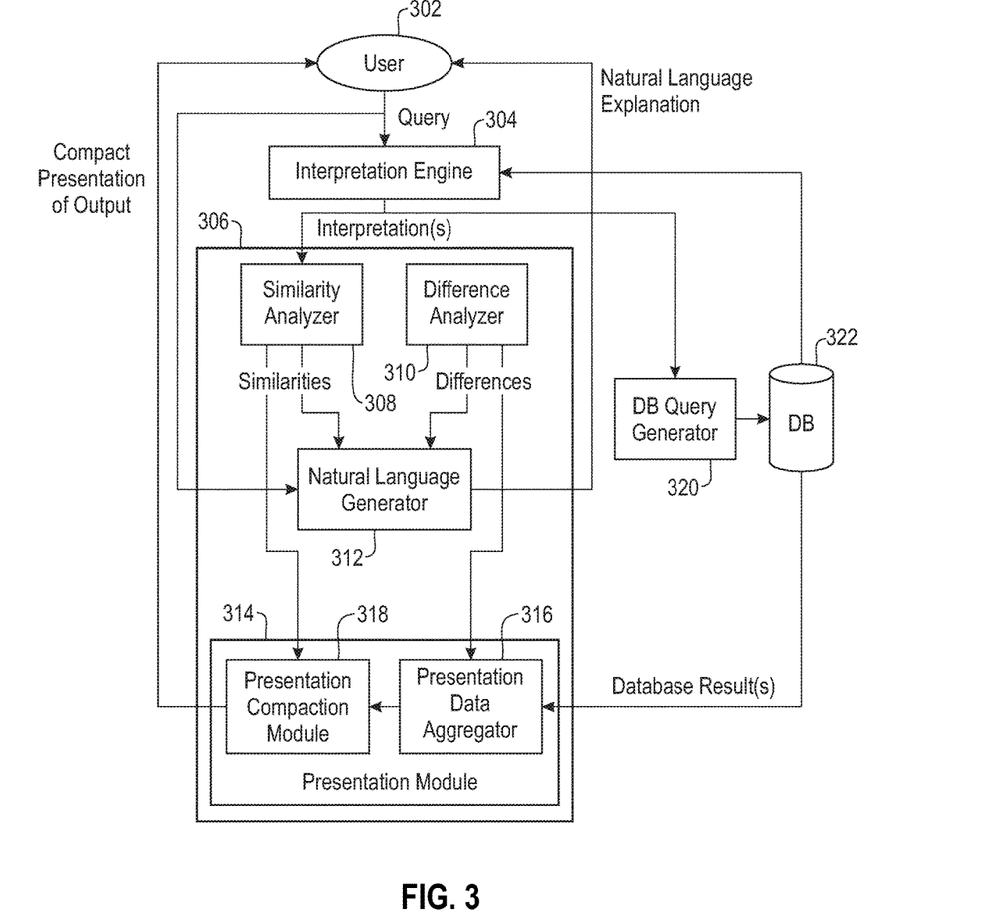
FIG. 3 is a diagram illustrating system architecture, according to an exemplary embodiment of the invention.

FIG. 3 is a diagram illustrating system architecture, according to an exemplary embodiment of the invention. By way of illustration, FIG. 3 depicts a user 302, who provides a query to an interpretation engine 304. The interpretation engine 304 then generates one or more interpretations of the query and provides the interpretations to a translation system 306 as well as to a database (DB) query generation component 320. As detailed herein, each interpretation is a logical semantic representation that describes a system's understanding of the input question. However, to obtain the actual response from the data stores, at least one embodiment of the invention includes translating an interpretation to the corresponding query language of that store. The DB query generation component 320 takes, as input, an interpretation and translates the interpretation to the corresponding structured query language (SQL) query, which can be fired against the database. Accordingly, the DB query generation component 320 provides an output to a database 322. In one or more embodiments of the invention, the database 322 can provide inputs to the interpretation engine 304. The input query can contain, for example, terms that are present in the database 322, such as names, locations, etc. Accordingly, the interpretation engine 304 is configured to be aware of such values present in the database 322 when forming an interpretation. As such, the interpretation engine 304 can use an inverted index of the database 322 while creating interpretations.

As additionally depicted in FIG. 1, the translation system 306 includes a similarity analyzer 308, a difference analyzer 310, a natural language generator 312, and a presentation module 314. As further detailed herein, the presentation module includes a presentation data aggregator 316 and a presentation compaction module 318.

Also, as illustrated in FIG. 3, the similarity analyzer 308 identifies similarities among the query interpretations generated by the interpretation engine 304, while the difference analyzer identifies differences among the query interpretations generated by the interpretation engine 304. As noted herein, an interpretation can include a structured representation of the semantics of an input query. Accordingly, each interpretation can have multiple components such as focus (what is being asked in the question), conditions (focus for the given values), etc. Each such component (focus, conditions, etc.) can be analyzed for one or more differences as well as one or more similarities. The similarities (identified by the similarity analyzer 308) and the differences (identified by the difference analyzer 310), along with the original query, are provided to the natural language generator 312, which generates a natural language explanation of the interpretations and provides the same to the user 302. Here, for each of the various components of interpretation (focus, conditions, etc.), at least one embodiment of the invention includes generating a string accordingly. For example, for focuses, such an embodiment can include starting with the term "showing" and then append each element of the focus in the interpretation.

Additionally, as also depicted in FIG. 1, the similarities (identified by the similarity analyzer 308) and the differences (identified by the difference analyzer 310) are provided to the presentation data aggregator 316 of the presentation module 314. During the difference analysis of interpretations, if the interpretations differ only in names, the presentation data aggregator 316 combines the interpretations. Accordingly, instead of outputting [X1, Y] and [X2, Y] to a user interface to create two tables, the presentation data aggregator 316 sends [X1, X2, Y] to the presentation module 314 to create only one table in the user interface. Also, one or more database results can be provided from the database 322 to the presentation data aggregator 316. Database results can include the results on executing the SQL query to the database. As detailed above, the presentation data aggregator 316 takes the database output for all of the interpretations and groups them. Based on the provided similarities and differences (as well as the provided database result(s)), the presentation data aggregator 316 generates an output (such as, for example, JavaScript™ object notation (JSON) or any other format which can be used by a user interface for visualization) and provides the same to the presentation compaction module 318, which generates a compact presentation of the output and provides the same to the user 302.

Figure 4:
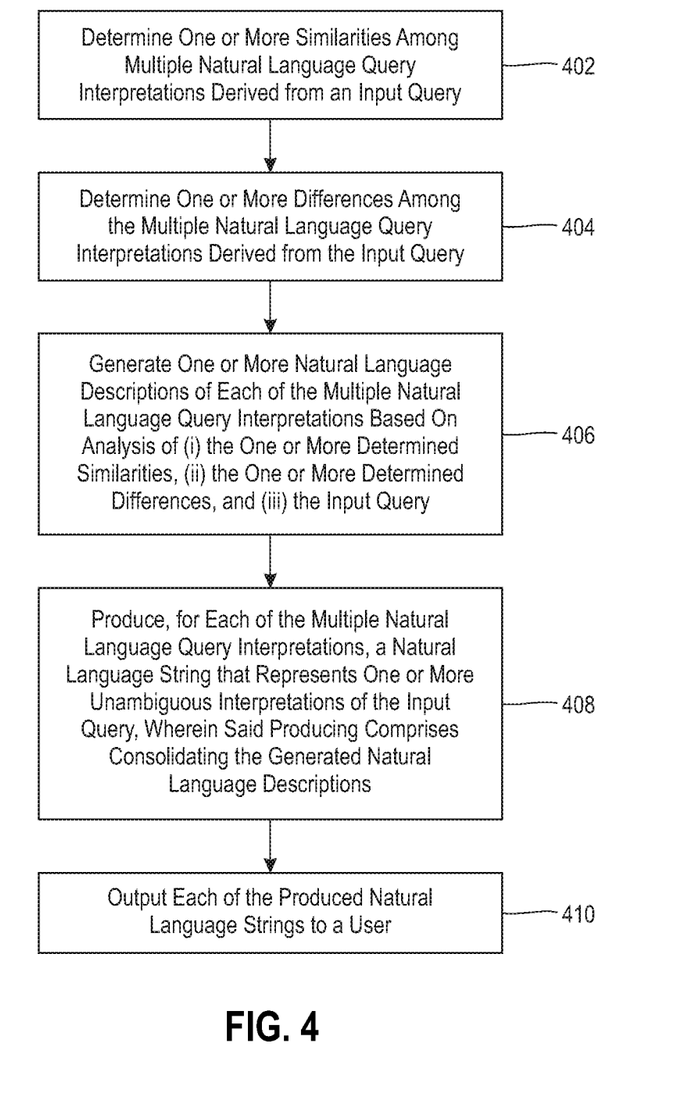
FIG. 4 is a flow diagram illustrating techniques according to an embodiment of the invention.

FIG. 4 is a flow diagram illustrating techniques according to an embodiment of the present invention. Step 402 includes determining one or more similarities among multiple natural language query interpretations derived from an input query. Also, step 404 includes determining one or more differences among the multiple natural language query interpretations derived from the input query.

Step 406 includes generating one or more natural language descriptions of each of the multiple natural language query interpretations based on analysis of (i) the one or more determined similarities, (ii) the one or more determined differences, and (iii) the input query. The generated natural language descriptions can include one or more structured natural language components, wherein the structured natural language components can include a common sequence of one or more words common to each of the multiple natural language query interpretations, as well as one or more sequences of one or more words that are distinct to each of the multiple natural language query interpretations.

Additionally, at least one embodiment of the invention can also include providing the one or more generated natural language descriptions of each of the multiple natural language query interpretations to a user responsible for submitting the input query.

Step 408 includes producing, for each of the multiple natural language query interpretations, a natural language string that represents one or more unambiguous interpretations of the input query, wherein said producing comprises consolidating the generated natural language descriptions. Step 410 includes outputting each of the produced natural language strings to a user. In at least one embodiment of the invention, outputting can include outputting each produced natural language string to a user responsible for submitting the input query.

The techniques depicted in FIG. 4 can also include generating the multiple natural language query interpretations by translating one or more structured language query interpretations to natural language using one or more domain-specific ontologies. In one or more embodiments of the invention, each of the one or more ontologies can include a descriptive model that includes a set of (i) one or more object types, (ii) one or more properties, and (iii) one or more relationship types. Also, at least one embodiment of the invention can include storing the generated natural language query interpretations in a database.

Further, the techniques depicted in FIG. 4 can include generating the multiple natural language query interpretations by translating one or more structured language query interpretations to natural language using one or more graph-based semantic representations. In one or more embodiments of the invention, each of the one or more graph-based semantic representations comprises a semantic network containing one or more facts about one or more relationships between one or more different objects. Also, at least one embodiment of the invention can include storing the generated natural language query interpretations in a database.

Also, an additional embodiment of the invention includes generating one or more structured language query interpretations of a query inputted by a user, translating the one or more structured language query interpretations to natural language using one or more domain-specific ontologies, and determining (i) one or more similarities among the natural language query interpretations and (ii) one or more differences among the natural language query interpretations. Such an embodiment also includes generating one or more natural language descriptions of each of the multiple natural language query interpretations based on analysis of (i) the one or more determined similarities, (ii) the one or more determined differences, and (iii) the query, and producing, for each of the multiple natural language query interpretations, a natural language string that represents one or more unambiguous interpretations of the query, wherein the producing comprises consolidating the generated natural language descriptions. Further, such an embodiment includes outputting each of the produced natural language strings to a user.

At least one embodiment of the invention (such as the techniques depicted in FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives query and query interpretation information sent from a data source to the transmission server. The server can process the information, for example, based upon user-provided user preference information that is stored in memory on the server. Subsequently, an alert is generated containing a compact presentation of a query interpretation output. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
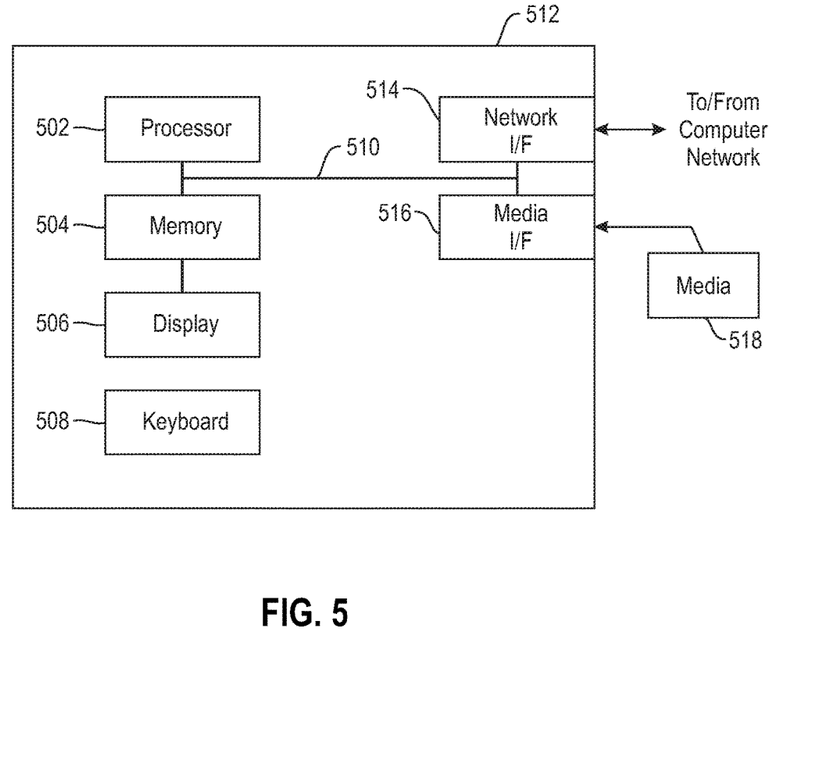
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
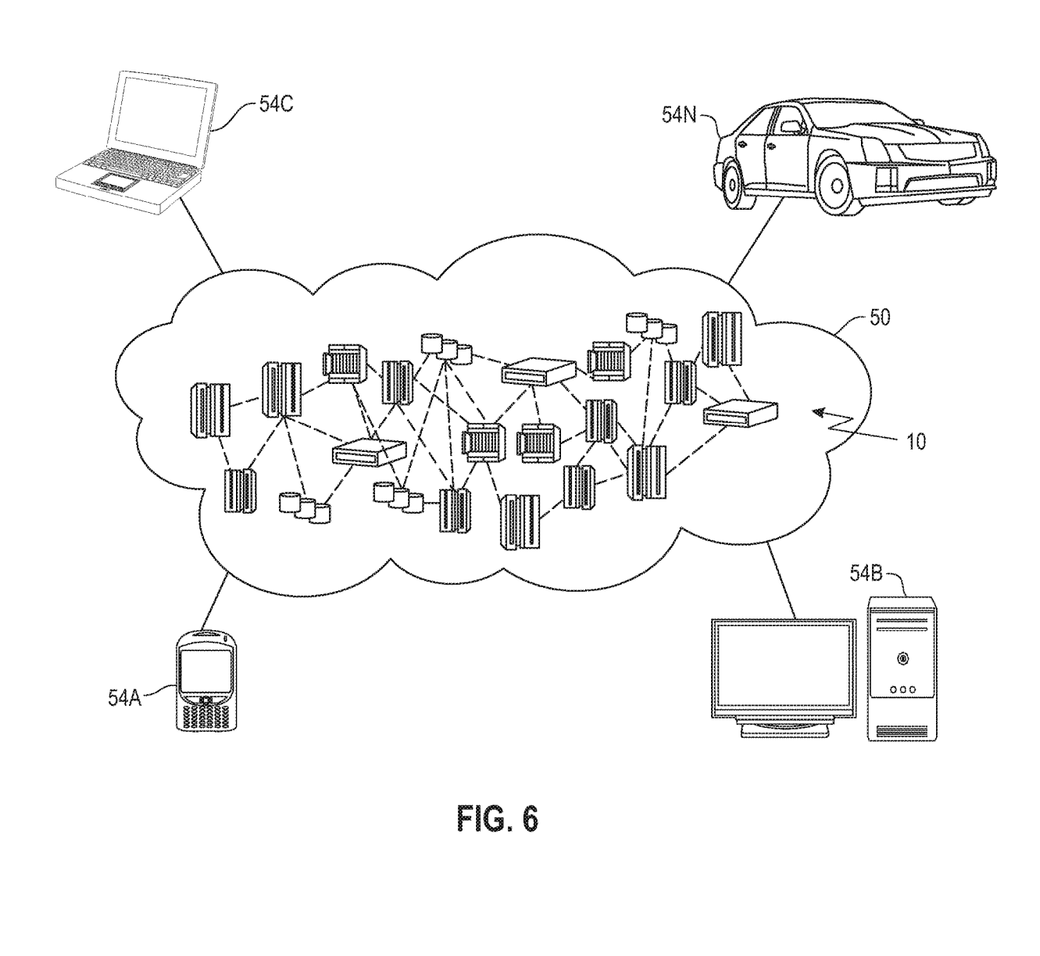
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
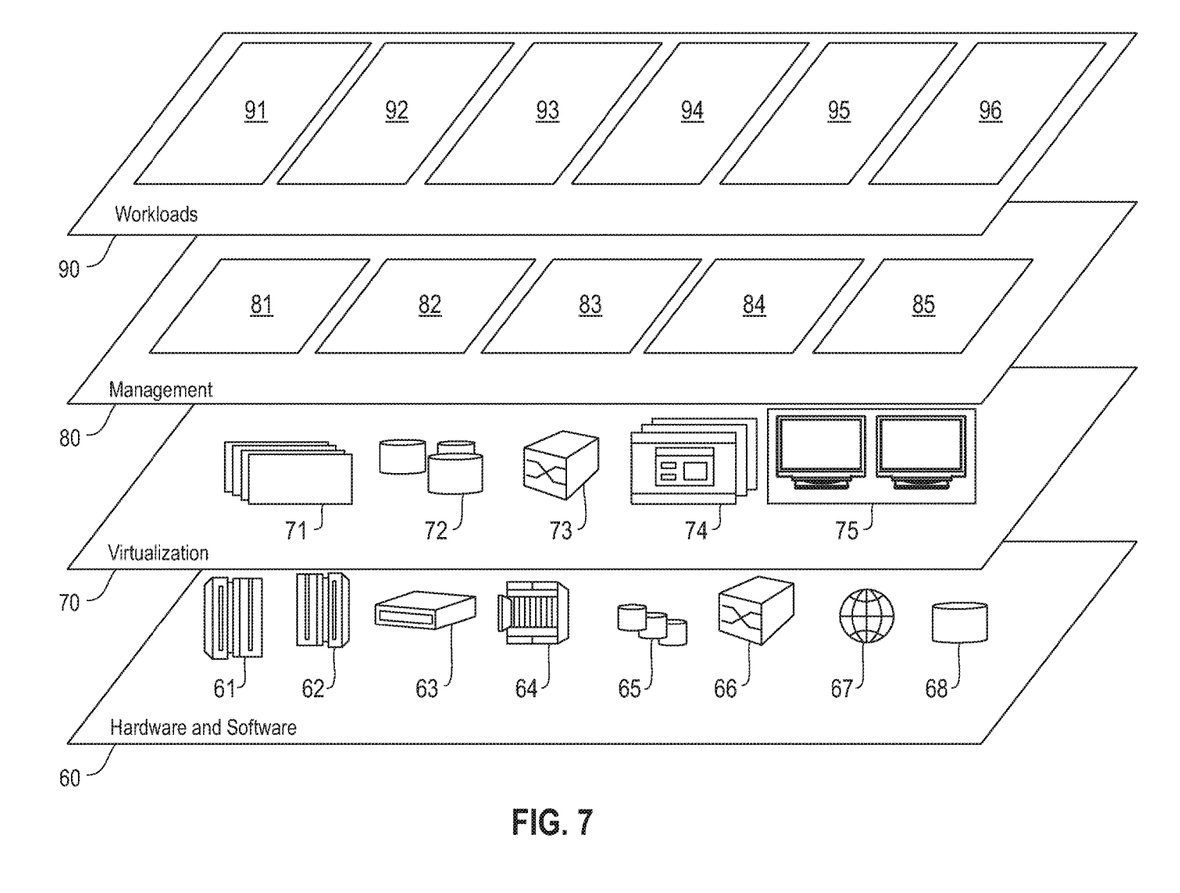
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing interpretations and an original question to create a compact presentation of responses, considering similarity and differences between the interpretations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
   determining one or more similarities among multiple natural language query interpretations derived from an input query;
   determining one or more differences among the multiple natural language query interpretations derived from the input query;
   generating one or more natural language descriptions of each of the multiple natural language query interpretations based on analysis of (i) the one or more determined similarities, (ii) the one or more determined differences, and (iii) the input query;
   producing, for each of the multiple natural language query interpretations, a natural language string that represents one or more unambiguous interpretations of the input query, wherein said producing comprises consolidating the generated natural language descriptions; and
   outputting each of the produced natural language strings to a user;
   wherein the steps are carried out by at least one computing device.

2. The computer-implemented method of claim 1, comprising:
   providing the one or more generated natural language descriptions to a user responsible for submitting the input query.

3. The computer-implemented method of claim 1, wherein the one or more generated natural language descriptions comprise one or more structured natural language components.

4. The computer-implemented method of claim 3, wherein the one or more structured natural language components comprise a common sequence of one or more words common to each of the multiple natural language query interpretations.

5. The computer-implemented method of claim 3, wherein the one or more structured natural language components comprise one or more sequences of one or more words that are distinct to each of the multiple natural language query interpretations.

6. The computer-implemented method of claim 1, wherein said outputting comprises outputting each produced natural language string to a user responsible for submitting the input query.

7. The computer-implemented method of claim 1, comprising:
generating the multiple natural language query interpretations by translating one or more structured language query interpretations to natural language using one or more domain-specific ontologies.

8. The computer-implemented method of claim 7, wherein each of the one or more ontologies comprises a descriptive model that includes a set of (i) one or more object types, (ii) one or more properties, and (iii) one or more relationship types.

9. The computer-implemented method of claim 7, comprising:
storing the generated natural language query interpretations in a database.

10. The computer-implemented method of claim 1, comprising:
generating the multiple natural language query interpretations by translating one or more structured language query interpretations to natural language using one or more graph-based semantic representations.

11. The computer-implemented method of claim 10, wherein each of the one or more graph-based semantic representations comprises a semantic network containing one or more facts about one or more relationships between one or more different objects.

12. The computer-implemented method of claim 10, comprising:
storing the generated natural language query interpretations in a database.

13. A computer program product comprising a computer readable storage medium having program instructions embodied therewith, the program instructions executable by a device to cause the device to:
determine one or more similarities among multiple natural language query interpretations derived from an input query;
determine one or more differences among the multiple natural language query interpretations derived from the input query;
generate one or more natural language descriptions of each of the multiple natural language query interpretations based on analysis of (i) the one or more determined similarities, (ii) the one or more determined differences, and (iii) the input query;
produce, for each of the multiple natural language query interpretations, a natural language string that represents one or more unambiguous interpretations of the input query, wherein said producing comprises consolidating the generated natural language descriptions; and
output each of the produced natural language strings to a user.

14. The computer program product of claim 13, wherein the program instructions executable by a computing device further cause the computing device to:
provide the one or more generated natural language descriptions to a user responsible for submitting the input query.

15. The computer program product of claim 13, wherein the one or more generated natural language descriptions comprise one or more structured natural language components.

16. The computer program product of claim 15, wherein the one or more structured natural language components comprise a common sequence of one or more words common to each of the multiple natural language query interpretations.

17. The computer program product of claim 15, wherein the one or more structured natural language components comprise one or more sequences of one or more words that are distinct to each of the multiple natural language query interpretations.

18. The computer program product of claim 13, wherein said outputting comprises outputting each produced natural language string to a user responsible for submitting the input query.

19. A system comprising:
a memory; and
at least one processor operably coupled to the memory and configured for:
determining one or more similarities among multiple natural language query interpretations derived from an input query;
determining one or more differences among the multiple natural language query interpretations derived from the input query;
generating one or more natural language descriptions of each of the multiple natural language query interpretations based on analysis of (i) the one or more determined similarities, (ii) the one or more determined differences, and (iii) the input query;
producing, for each of the multiple natural language query interpretations, a natural language string that represents one or more unambiguous interpretations of the input query, wherein said producing comprises consolidating the generated natural language descriptions; and
outputting each of the produced natural language strings to a user.

20. A computer-implemented method, comprising steps of:
generating one or more structured language query interpretations of a query inputted by a user;
translating the one or more structured language query interpretations to natural language using one or more domain-specific ontologies;
determining (i) one or more similarities among the natural language query interpretations and (ii) one or more differences among the natural language query interpretations;
generating one or more natural language descriptions of each of the multiple natural language query interpretations based on analysis of (i) the one or more determined similarities, (ii) the one or more determined differences, and (iii) the query;
producing, for each of the multiple natural language query interpretations, a natural language string that represents one or more unambiguous interpretations of the query, wherein said producing comprises consolidating the generated natural language descriptions; and
outputting each of the produced natural language strings to a user;
wherein the steps are carried out by at least one computing device.

* * * * *